United States Patent
Li et al.

(10) Patent No.: US 6,961,365 B2
(45) Date of Patent: Nov. 1, 2005

(54) METHOD FOR SIGNAL PROCESSING IN USER EQUIPMENT OF CDMA MOBILE COMMUNICATION SYSTEM

(75) Inventors: Feng Li, Beijing (CN); Yusong He, Beijing (CN); Tiezhu Xu, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 203 days.

(21) Appl. No.: 10/268,349

(22) Filed: Oct. 9, 2002

(65) Prior Publication Data

US 2003/0053436 A1 Mar. 20, 2003

Related U.S. Application Data

(63) Continuation of application No. PCT/CN01/00134, filed on Feb. 20, 2001.

(30) Foreign Application Priority Data

Apr. 11, 2000 (CN) .......................................... 00105846 A

(51) Int. Cl.[7] .......................... H04B 1/69; H04B 7/216
(52) U.S. Cl. ...................................... 375/148; 370/342
(58) Field of Search ................................ 375/148, 130, 375/147, 347, 316, 340; 370/342, 335, 320, 441

(56) References Cited

U.S. PATENT DOCUMENTS

| | | | | |
|---|---|---|---|---|
| 5,867,478 A | * | 2/1999 | Baum et al. | ................ 370/203 |
| 6,304,618 B1 | * | 10/2001 | Hafeez et al. | .............. 375/341 |
| 6,370,182 B2 | * | 4/2002 | Bierly et al. | ................ 375/140 |
| 6,707,864 B2 | * | 3/2004 | Kim | ........................... 375/343 |
| 2001/0033614 A1 | * | 10/2001 | Hudson | ...................... 375/229 |

FOREIGN PATENT DOCUMENTS

| | | |
|---|---|---|
| WO | WO 9843459 | 10/1998 |
| WO | WO 9908401 | 2/1999 |
| WO | WO 9940698 | 8/1999 |
| WO | WO 9959351 | 11/1999 |
| WO | WO 9960759 | 11/1999 |
| WO | WO 0064113 | 10/2000 |

OTHER PUBLICATIONS

Jung, Peter; Nasshan, M "Results on Turbo–Codes for speech transmission in a joint detection CDMA mobile radio system with coherent receiver antenna diversity" Nov., 1997, Vehicular Technology, IEEE transactions on, vol. 46, pp. 862–887.*

International Search Report corresponding to International Application No. PCT/CN01/00134 dated May 17, 2001.

* cited by examiner

Primary Examiner—Khai Tran
(74) Attorney, Agent, or Firm—Alston & Bird LLP

(57) ABSTRACT

The invention discloses to a signal processing method for user equipment in a CDMA mobile communication system. The signal processing method is a combination of time diversity and joint detection in order to raise diversity gain of a receiver. The method comprises: sample a received signal on time domain, estimate spatial channel impulse response value, obtain matrixes, constitute a system matrix, perform joint detection algorithm and obtain an estimated value of original sending data. When the method is used in a mobile user equipment, the uplink and downlink performance unmatched problem can be solved, using same frequency multiplexing can be reached and the joint detection algorithm is a simpler one. The method also can be used in a base station.

5 Claims, 2 Drawing Sheets

METHOD FOR SIGNAL PROCESSING IN USER EQUIPMENT OF CDMA MOBILE COMMUNICATION SYSTEM

CROSS-REFERENCE TO RELATED APPLICATIONS

This is a continuation application of PCT/CN01/00134, filed Feb. 20, 2001, which is incorporated herein by reference in its entirety. The present application also claims the benefit of Chinese Patent Application No. 00105846.0, filed Apr. 11, 2000.

FIELD OF THE INVENTION

The present invention relates generally to CDMA cellular mobile communication technology, and more particularly to a method for signal detection and processing of user equipment ("UE") in a CDMA spread spectrum cellular mobile communication system. The method is a combination of time diversity and joint detection.

BACKGROUND OF THE INVENTION

In principle, in order to overcome multipath and multiple access interference in a code division multiple access ("CDMA") spread spectrum cellular mobile communication system, especially a Time Division Duplex ("TDD") CDMA mobile communication system, a base transceiver station ("BTS") and a user equipment can all deploy time diversity methods to raise system performance and deploy joint detection algorithms as a basic signal detection method to suppress Multiple Access Interference ("MAI") and Inter-Symbol Interference ("ISI"). Specifically, the BTS side can deploy smart antenna technology. In this case, by using multiple antenna units, spatial diversity gain can be obtained and with corresponding beam synthesized algorithms, receiving sensitivity can be raised (it can be understood as decreasing interference and suppressing white noise at the same time). However, at the UE side, in order to decrease cost and size, usually only one antenna is used for receiving. In this case, as multiple antenna receiving technology cannot be used, (i.e., same frequency interference and hot noise cannot be suppressed by spatial diversity), so uplink and downlink receiving gain is unmatched.

Multipath and multiple access interference can be suppressed to a maximum degree at the BTS in a CDMA spread spectrum cellular mobile communication system applying joint detection algorithms, as joint detection algorithms can estimate multipath and multiple access interference coming from all users in this cell. However, at the UE, although multipath and multiple access interference coming from the cell user can be suppressed to a maximum degree by using a joint detection algorithm, for those users at the cell edge, the joint detection algorithm cannot estimate and suppress the signal that comes from neighboring cells with the same frequency and the signal adds to the system as noise. This signal decreases system performance greatly, and the noise coefficient of the receiver limits the receiving sensitivity. In this case, if there is no appropriate signal processing method, the error rate of the receiving signal will greatly increase and the communication may even be interrupted.

Although, power control and smart antenna algorithms can suppress interference coming from neighbor cells to a maximum degree, without appropriate methods to raise UE receiving gain communication quality will also be seriously decreased and communication may even also be interrupted. For the purpose of same frequency multiplexing in a CDMA spread spectrum cellular mobile communication system, the only way to do is to decrease the working channels activated at the same time to guarantee the UE communication quality in the cells overlap area. However, this will decrease system capacity.

SUMMARY OF THE INVENTION

In order to solve the problem mentioned a baseband processing method that is appropriate to UE is proposed.

The purpose of the invention is to provide a signal processing method for UE in a CDMA spread spectrum cellular mobile communication system. The method will increase UE (receiver) diversity gain and when used in a mobile terminal the method will solve the uplink and downlink unmatched problem. The method will reach same frequency multiplexing purpose without increasing calculation amount greatly, and when it is used in a BTS, receiving gain is also increased.

The implementation of the invention is as follows: a signal processing method of user equipment in a CDMA spread spectrum cellular mobile communication system, characterized in that the method is a combination of time diversity and joint detection.

The method of combining time diversity and joint detection comprises the following steps:

sampling a received signal in multi-times on time domain, then obtaining plurality of sampled data;

making joint detection for plurality of sampled data to get original sending data estimated value, wherein said making joint detection for plurality of sampled data comprising:

estimating spatial channel impulse response for each sampled data $e_i$ of the plurality of sampled data $e_i$, i=1 . . . M, then getting M spatial channel impulse response estimated values $h_i$, wherein M references sample time number;

getting M matrixes $A_i$ from the obtained each spatial channel impulse response estimated value $h_i$;

estimating the original sending data estimated value according to the sampled data $e_i$ and the matrixes $A_i$.

The invention method, combining time diversity and joint detection algorithm, applies an optimal algorithm, which uses diversity gain obtained on time domain, to raise signal noise ratio of receiving signal of user equipment.

A signal processing method for user equipment of the invention is a method combining time diversity and joint detection. Without greatly increasing calculation complexity, user equipment in CDMA spread spectrum cellular mobile communication system can obtain diversity gain, so receiver sensitivity is raised, system capacity is increased and uplink and downlink performance unmatched problem is solved. Again, taking time diversity, a relatively simple algorithm of joint detection can be used, so without increasing total calculation amount the method has stronger anti-interference performance compared with only using a joint detection algorithm. The method of the invention also can be used in BTS to raise the receiving gain.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The embodiment takes Time Division Synchronized CDMA (TD-SCDMA) system as an example. The TD-SCDMA system is proposed by CWTS and is one of the IMT-2000 Radio Transmission Technologies.

Figure 1:
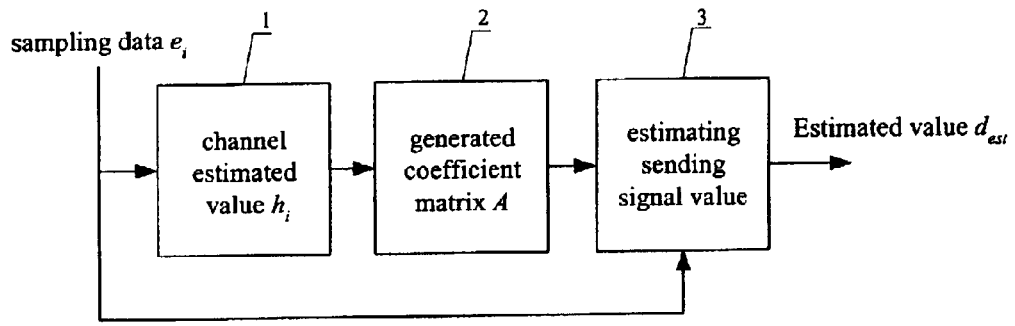
FIG. 1 is an exemplary block diagram of the joint detection algorithm of an embodiment of the invention.

FIG. 1 shows the implementation steps of a joint detection algorithm in a TD-SCDMA system. Suppose the sent original data is d, a system matrix A represents spread spectrum, scrambling and spatial channel functions, n represents same frequency interference between neighbor cells and hot noise, then data e received by user equipment (receiver) can be expressed by the following formula (1):

$$e = Ad + n \tag{1}$$

Figure 2:
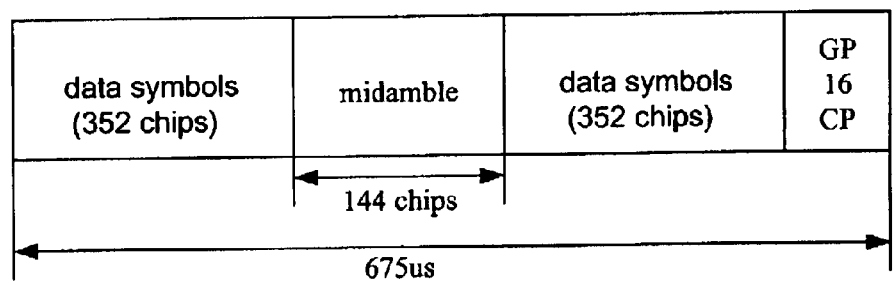
FIG. 2 is an exemplary burst data structure diagram in a TDD CDMA mobile communication system.

Step 1 of FIG. 1 represents solving an impulse response estimated value $h_i$ from the received sample data $e_i$. In a TD-SCDMA system, burst data structure defines training sequence midamble for channel estimation is shown in FIG. 2. The training sequence midamble is located in a time slot width (usually, it is several hundreds microsecond, and it is 675 $\mu$s in the Figure). Before and after the training sequence midamble (it is 144 chips length in the Figure), there are Data Symbols (the length is 352 chips in the Figure). When $m_i$ represents a training sequence midamble sent by a user i, $e_{mid}$ represents a training sequence midamble received, and $n_m$ represents noise interference at training sequence midamble, then there is the following formula:

$$e_{mid} = \sum_i m_i \otimes h_i + n_m \tag{2}$$

Wherein $\otimes$ symbol represents convolution.

The channel impulse response estimated value $h_i$ in UE receiving end can be solved by formula (3):

$$h_i = G^{-1} e_{mid} \tag{3}$$

The G matrix in formula (3) is a coefficient matrix generated by every user training sequence midamble.

In FIG. 1, steps 1 and 2 represent the procedure for obtaining impulse response estimated value $h_i$ at the UE side and the procedure for generating the system matrix $A_i$ by the obtained $h_i$ and the UE user spread spectrum code, respectively. (The generating technology of system matrix $A_i$ is in another invention patent of the inventor.)

The purpose of joint detection is to estimate d according to e and A. Step 3 in FIG. 1 is an implementation of joint detection, (i.e. estimating sending signal). There are various algorithms to implement estimating $d_{est}$, including:

$$d_{est} = (diag(A^{*T}A))^{-1} A^{*T} e \tag{4}$$

or $$d_{est} = (A^{*T}A)^{-1} A^{*T} e \tag{5}$$

etc., wherein *T represents conjugation transpose and diag is a diagonal matrix symbol.

Taking formula (5) as a specific algorithm example describes the combination method of time diversity and joint detection.

Figure 3:
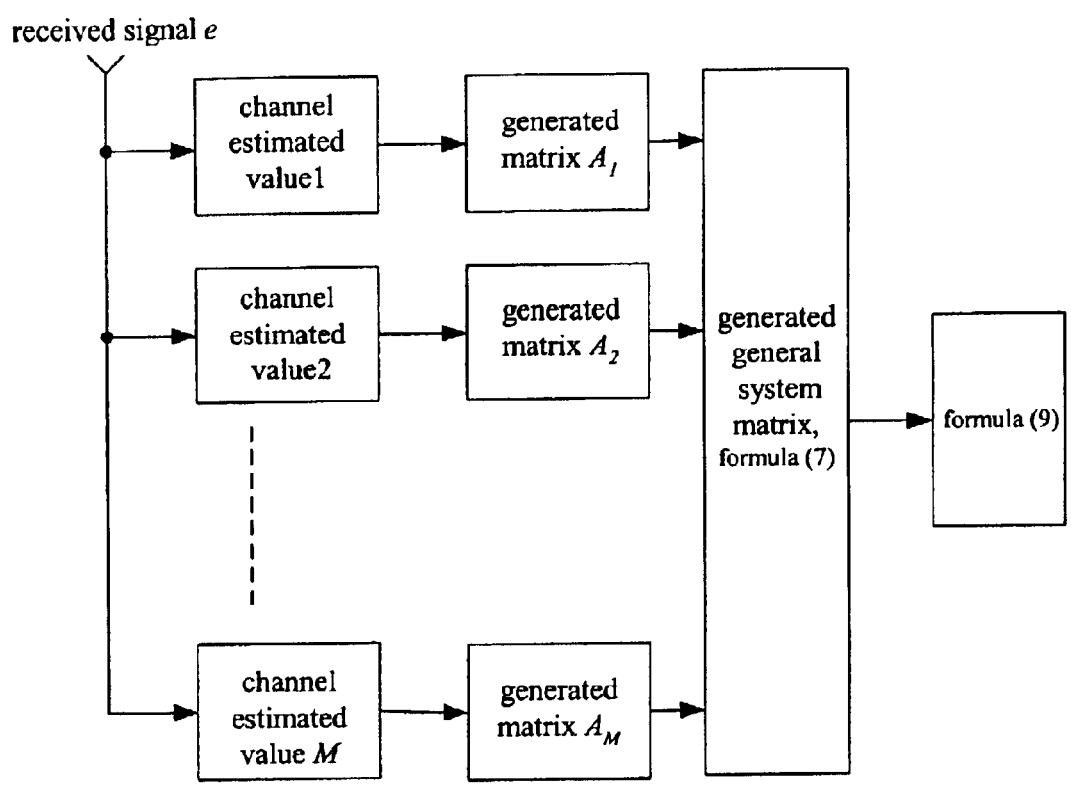
FIG. 3 is an exemplary block diagram of an embodiment of the invention method combining time diversity and joint detection.

Referring to FIG. 3, the method of the invention, which combines time diversity and joint detection, comprises the following steps:

1) UE makes an $i^{th}$ sample of received signal e on time domain and obtains sampled data $e_i$;

2) make an impulse response estimate of a spatial channel according to sampled data $e_i$ and obtains the spatial channel impulse response estimated value $h_i$;

3) obtain matrix $A_i$ from the obtained spatial channel impulse response estimated value $h_i$;

4) repeat steps 1), 2), 3) M times in total, (i.e., after M times sampling of a received signal), the sampled data can be expressed by $e_i$, i=1, ..., M. In the received signal, the part corresponding to the training sequence midamble can be expressed as $e_{mid-i}$, i=1, ..., M. According to formula (3), after sampling the received signal with M times, M spatial channel impulse response estimated values $h_i$, i=1, ..., M can be obtained. Then, according to the M spatial channel impulse response estimated values $h_i$, M matrixes $A_i$ can be obtained;

5) constitute a system matrix A by the M matrixes $A_i$;

6) perform a joint detection algorithm based on the system matrix A and obtain an estimated value of the original sending data. If simply using formula (5) for calculation, M estimated values of the original sending data $d_i$, i=1, ..., M can be obtained. Then, process M estimated values $d_i$ with the following formula:

$$d_{sum} = \sum_{i=1}^{M} d_i = \sum_{i=1}^{M} (A_i^{*T} A_i)^{-1} A_i^{*T} e_i \tag{6}$$

Making a decision according to the sign of $d_{sum}$, then an original sending data is recovered. With formula (6), diversity gain is raised, but at the same time, the operation amount is increased by M times. In order to raise diversity gain and without increasing operation amount, the invention applies the following method:

Suppose:

$$A_{sum} = (A_1^T, A_2^T \ldots A_M^T)^T \tag{7}$$

$$e_{sum} = (e_1^T, e_2^T \ldots e_M^T)^T \tag{8}$$

Then, an estimated value of original sending data can be expressed as:

$$d_{est} = \left( \sum_{i=1}^{M} A_i^{*T} A_i \right)^{-1} A_{sum}^{*T} e_{sum} \tag{9}$$

Comparing formulas (6) and (9), it is seen that formula (9) greatly decreases matrix inverse calculations, which require a larger number of operations. Therefore, the total operation amount of formula (9) is greatly decreased compared with formula (6).

When sampling times M is larger, formula (4) combining time diversity and joint detection algorithm can be used, i.e., $$d_{est} = \left(\text{diag}\left(\sum_{i=1}^{M}{}^{*T}A_i\right)\right)^{-1} A_{sum}^{*T}e_{sum} \quad (10)$$

The operation amount of formula (10) is lower then formula (9). When M takes an appropriate value, the operation amount of formula (10) is that near the operation amount of formula (5), but the performance of formula (10) is better than formula (5).

From the above analysis, it is seen that using the method proposed by the invention for combining time diversity and joint detection algorithm, the unmatched problem of uplink and downlink receiving gain can be solved and the UE receiving signal noise ratio can be raise without increasing operation amount. Consequently, in a CDMA spread spectrum cellular mobile communication system, same frequency multiplexing of neighbor cells is implemented without decreasing communication quality.

Although the embodiment of the invention is designed for a UE based on a TD-SCDMA system, it can be directly used in other CDMA systems with TDD mode, such as, for example, UTRA TDD, another CDMA TDD system in IMT-2000. The invention also can be directly used in BTS of CDMA TDD system. After appropriate revision, the invention can be thoroughly used in UE and BTS of other CDMA mobile communication system applying joint detection algorithm.

What is claimed:

1. A signal processing method in a code division multiple access mobile communication system, comprising:

sampling a signal at a plurality of instances in a time domain to thereby obtain a plurality of sampled data; and performing a joint detection process based upon a plurality of the sampled data to thereby obtain an estimated value of the signal, wherein performing a joint detection process for said plurality of sampled data comprises:

estimating spatial channel impulse response for each sampled data $e_i$ of the plurality of sampled data $e_i$, i=1 ... M, getting M spatial channel impulse response estimated values $h_i$, wherein M references the number of sample times;

getting M matrixes $A_i$ from the obtained each spatial channel impulse response estimated value $h_i$; and estimating the original sending data estimated value according to the sampled data $e_i$ and the matrixes $A_i$.

2. The method according to claim 1, wherein the spatial channel impulse response estimated value $h_i$ is obtained by first using formula $$e_{mid} = \sum_i m_i \otimes h_i + n_m,$$

and then formula $h_i = G^{-1}e_{mid}$; wherein $\otimes$ represents convolution, wherein $e_{mid}$ is the training sequence midamble received by user equipment, G is a coefficient matrix generated by the training sequence midamble of user equipment, $m_i$ is a training sequence midamble sent by the $i^{th}$ user equipment, and $n_m$ represents noise interference at training sequence midamble.

3. The method according to claim 1, wherein the original sending data estimated value $d_{sum}$ is estimated by using formula:

$$d_{sum} = \sum_{i=1}^{M} d_i = \sum_{i=1}^{M}(A_i^{*T}A_i)^{-1}A_i^{*T}e_i$$

wherein *T represents conjunction transpose and diag is a diagonal matrix symbol.

4. The method according to claim 1, wherein the original sending data estimated value $d_{est}$ is estimated by using formulas:

$$d_{est} = \left(\sum_{i=1}^{M} A_i^{*T}A_i\right)^{-1} A_{sum}^{*T}e_{sum},$$

wherein $A_{sum}=(A_1^T, A_2^T \ldots A_M^T)^T$, $e_{sum}=(e_1^T, e_2^T \ldots e_M^T)^T$ and *T represents conjunction transpose.

5. The method according to claim 1, wherein when M is larger, the original sending data estimated value $d_{est}$ is estimated by using formula:

$$d_{est} = \left(\text{diag}\left(\sum_{i=1}^{M}{}^{*T}A_i\right)\right)^{-1} A_{sum}^{*T}e_{sum},$$

wherein $A_{sum}=(A_1^T, A_2^T \ldots A_M^T)^T$, $e_{sum}=(e_1^T, e_2^T \ldots e_M^T)^T$ and *T represents conjunction transpose.

* * * * *